May 2, 1967     L. R. CARPENTER ETAL     3,316,803
THREE DIMENSIONAL VOLUMETRIC DISPLAY MEANS
Filed Jan. 7, 1965
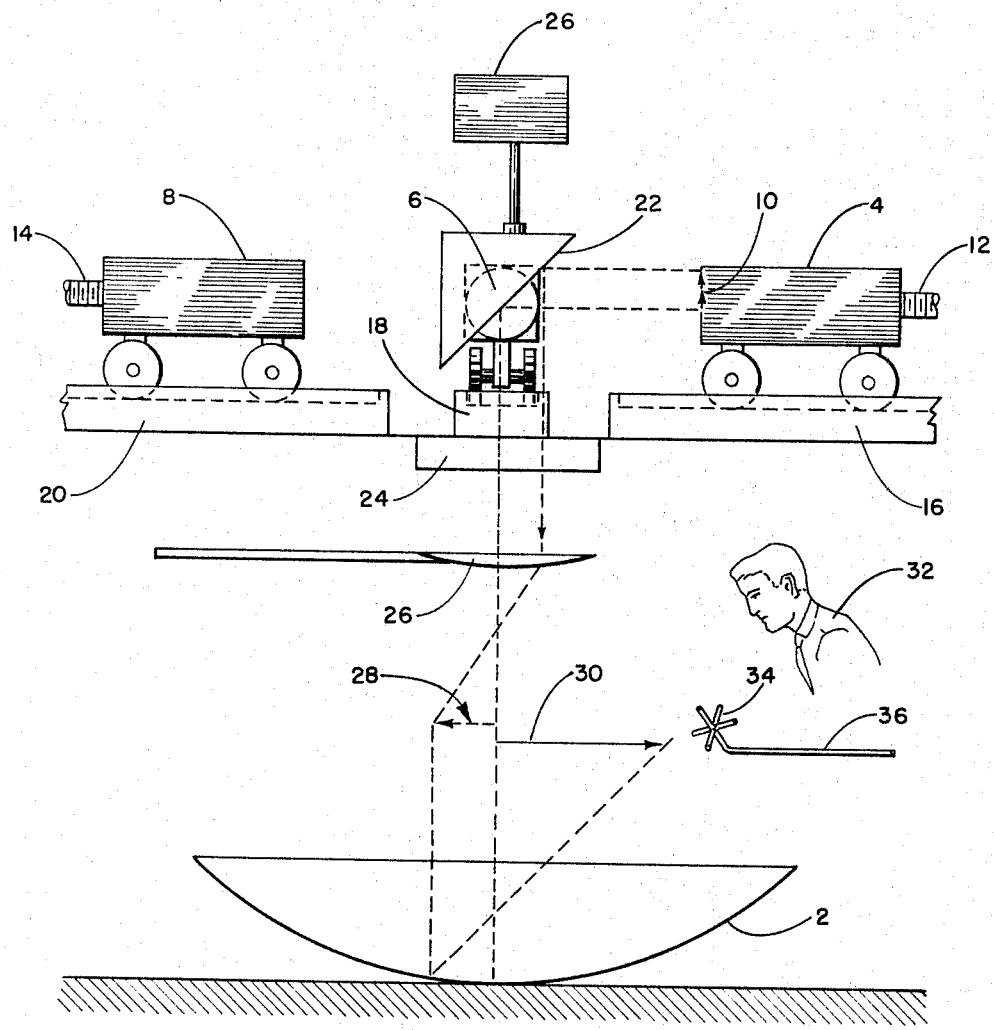
LEWIS R. CARPENTER
DONALD MAKUCH
INVENTORS
BY *Robert M. Sperry*
ATTORNEY

United States Patent Office 3,316,803
Patented May 2, 1967

3,316,803
THREE DIMENSIONAL VOLUMETRIC DISPLAY MEANS
Lewis R. Carpenter, Lancaster, Calif., and Donald Makuch, Detroit, Mich., assignors, by mesne assignments, to LTV Aerospace Corporation, Dallas, Tex., a corporation of Delaware
Filed Jan. 7, 1965, Ser. No. 423,939
2 Claims. (Cl. 88—24)

This invention relates to display means and is particularly directed to novel methods and apparatus for providing a three dimensional volumetric display.

One of the by-products of the tremendous technological advances which have been achieved in recent years has been the vastly increased complexity of man-machine integration problems. Thus, in many applications, it is desirable for machines to supply men with as much information as possible ins the shortest possible time. It has been found that this often can be accomplished best by providing a visual display of such information. On the other hand, many problems require interpretation of three dimensional information. Typical of these problems are airport traffic control, space flight navigation, rendezvous of vehicles in space, and many other problems. Unfortunately, two dimensional visual displays of such problems do not immediately provide all necessary information. Accordingly, numerous systems have been proposed heretofore for providing three dimensional visual displays. However, none of the prior art systems have been entirely satisfactory and most of them have been highly expensive. Many of the prior art systems have been electromechanical devices designed to represent one specific problem. Such devices are generally extremely complicated, require constant maintenance, and, obviously, are not readily adaptable to display other problems. In addition, several electronic or electro-optical devices have been proposed. Again, these systems have generally been extremely complex and often involve components which, although theoretically possible, have not yet been developed.

These disadvantages of the prior art are overcome and a novel display apparatus is provided which is the ultimate in simplicity, requires virtually no maintenance, is instantly adaptable to represent a wide variety of problems and, yet, is extremely economical. At the same time, the device of the present invention provides a continuous display which may show three dimensional relationships between a plurality of objects simultaneously and which instantaneously represents new information supplied thereto.

The advantages of the present invention are preferably attained by providing a three dimensional volumetric display device comprising a parabolic mirror, at least one object positioned as the objective for the real image field of said mirror and adjustably positionable with a plurality of degrees of freedom, and at least one set of coordinate axes mounted adjacent said real image field and adjustably positionable with a plurality of degrees of freedom.

Accordingly, it is an object of the present invention to provide improved means for providing three dimensional volumetric displays.

Another object of the present invention is to provide a three dimensional volumetric display device which is simple in construction, requires virtually no maintenance, and is economical.

A further object of the present invention is to provide a three dimensional volumetric display device which is readily adaptable to represent a wide variety of problems.

An additional object of the present invention is to provide a three dimensional volumetric display device providing a continuous display which may show three dimensional relationships between a plurality of objects and which instantaneously represents new information supplied thereto.

A specific object of the present invention is to provide a three dimensional volumetric display device comprising a parabolic mirror, at least one object positioned as the object for the real image field of said mirror and adjustably positionable with a plurality of degrees of freedom, and at least one set of coordinate axes mounted adjacent said real image field and adjustably positionable with a plurality of degrees of freedom.

These and other objects and features of the present invention will be apparent from the following detailed description taken with reference to the figures of the accompanying drawings.

In the drawings:

FIGURE 1 is a diagrammatic representation of a display device embodying the present invention.

In that form of the present invention chosen for purposes of illustration, FIG. 1 shows a parabolic mirror 2, a plurality of cathode ray tubes 4, 6 and 8, and an optical system for causing symbols displayed on the cathode ray tubes 4, 6 and 8 to appear, apparently suspended in mid-air, in the real image field of the mirror 2. The display of each of the cathode ray tubes, represented by arrow 10 on cathode ray tube 4, has two degrees of freedom supplied electronically while a third degree of freedom is established by providing screw drives, indicated at 12 and 14, to permit axial positioning of the cathode ray tubes along tracks 16, 18, and 20. Additional degrees of freedom may also be provided, as will be apparent to those skilled in the art.

As shown, light from the display 10 of cathode ray tube 4 is reflected from an inclined plane mirror 22 to a collimating lens 24. The mirror 22 is mounted for rotation by a motor 26 so as to sequentially reflect the displays of each of the cathode ray tubes 4, 6 and 8 to the collimating lens 24. The rate of rotation of the mirror 22 is preferably such that the displays of all of the cathode ray tubes 4, 6 and 8 will appear to be reflected simultaneously to the collimating lens 24. The collimating lens 24 collimates light incident thereon and passes the light to a plano-convex lens 26 which focuses the light to form an image, as indicated in dashed lines at 28. The image 28 serves as an object for the parabolic mirror 2 which, in turn, focuses the light to form a real image, as indicated at 30. By proper selection of the position and focal length of lens 26, the image-object 28 may be formed between the focal point and center of curvature of mirror 2. When this is done, image 30 will be enlarged and, since it is a real image, it can be seen by an observer 32 and will give the appearance of a solid article floating in mid-air. Providing a plurality of cathode ray tubes 4, 6 and 8, as described above, results in the simultaneous appearance of a plurality of such real images 30. Moreover, by changing the position of the cathode ray tubes or the position of the displays of the cathode ray tubes, the images 30 may be made to maneouver with respect to each other within the real image field of mirror 2 to provide provide a three dimensional, volumetric display. If desired, reference means, such as axes 34 may be mounted by suitable means, such as rod 36, within the real image field of mirror 2 to provide a frame of reference with respect to which the images 30 may be moved.

Information to be displayed may be derived from radar tracking stations, radio transmission from space vehicles or other appropriate sources and is displayed by suitably controlling the size, position and orientation of the display of a respective one or more of the cathode ray tubes 4, 6 and 8. Moreover, the cathode ray tubes 4, 6 and 8 may, if desired, be controlled by computers supplied with data directly from the information source. When this is done, any change in the information will be represented, almost instantaneously, by a corresponding change in the display appearing in the real image field of the parabolic mirror 2.

Obviously, numerous other variatons and modifications may be made without departing from the present invention. Accordingly, it should be clearly understood that the form of the invention described above and shown in the figure of the accompanying drawing is illustrative only and is not intended to limit the scope of the invention.

What is claimed is:

1. A three dimensional volumetric display device comprising:

a parabolic mirror;

a plurality of illuminated objects mounted above said parabolic mirror substantially perpendicular to the axis of said parabolic mirror, means mounting each of said objects for independent adjustable positioning with a plurality of degrees of freedom, a rotating mirror mounted to receive light from all of said objects during each rotation and to reflect said light parallel to the axis of said parabolic mirror, lens means mounted between said rotating mirror and said parabolic mirror for focusing light from said objects to form the objective for the real image field of said parabolic mirror, collimating means interposed between said objects and said lens means for collimating light passing from said objects to said lens means, and reference means mounted adjacent said real image field and adjustably positionable with a plurality of degrees of freedom.

2. A three dimensional volumetric display device comprising:

a parabolic mirror, a plurality of cathode ray tubes mounted above said parabolic mirror substantially perpendicular to the axis of said parabolic mirror, means mounting each of said tubes for independent adjustable positioning with a plurality of degrees of freedom, a rotating mirror mounted to receive light from all of said cathode ray tubes during each rotation and to reflect said light parallel to the axis of said parabolic mirror, lens means mounted between said rotating mirror and said parabolic mirror for focusing light from said objects to form the objective for the real image field of said parabolic mirror, collimating means interposed between said cathode ray tubes and said lens means for collimating light passing from said cathode ray tubes to said lens means, and reference means mounted adjacent said real image field and adjustably positionable with a plurality of degrees of freedom.

References Cited by the Examiner

UNITED STATES PATENTS

| 2,553,903 | 5/1951 | Dufour | 88—24 |
| 3,203,328 | 8/1965 | Brueggemann | 95—15 |

FOREIGN PATENTS 577,171  5/1958  Italy.

JOHN M. HORAN, *Primary Examiner.*

NORTON ANSHER, *Examiner.*

H. H. FLANDERS, *Assistant Examiner.*